US005702131A

United States Patent [19]

Kieffer

[11] Patent Number: 5,702,131

[45] Date of Patent: Dec. 30, 1997

[54] OUTLET FITTING FOR A PORTABLE TURBINE

[75] Inventor: Joseph W. Kieffer, Rogers, Minn.

[73] Assignee: Wagner Spray Tech Corporation, Minneapolis, Minn.

[21] Appl. No.: 596,875

[22] Filed: Mar. 1, 1996

[51] Int. Cl.$^{6}$ .......... F16L 5/00

[52] U.S. Cl. .......... 285/139.3; 285/139.1

[58] Field of Search .......... 285/31, 41, 161, 285/205, 206, 208, 219, 139.1, 139.3; 415/119; 181/229

[56] References Cited

U.S. PATENT DOCUMENTS

| | | | |
|---|---|---|---|
| 2,100,796 | 11/1937 | Church | 285/161 |
| 2,255,673 | 9/1941 | McDermott | 285/161 |
| 2,821,567 | 1/1958 | Bergan | 285/161 |
| 4,000,918 | 1/1977 | Reker | 285/161 |
| 4,083,410 | 4/1978 | Anderson | 285/32 |
| 5,037,140 | 8/1991 | Anderson | 285/161 |
| 5,072,072 | 12/1991 | Bawa et al. | 285/161 |
| 5,174,610 | 12/1992 | Svendsen et al. | 285/41 |
| 5,230,536 | 7/1993 | Rider et al. | 285/161 |
| 5,498,036 | 3/1996 | Kingsford | 285/161 |
| 5,556,255 | 9/1996 | Kieffer | 415/212.1 |
| 5,573,371 | 11/1996 | Kieffer | 415/182.1 |

*Primary Examiner*—Eric K. Nicholson
*Attorney, Agent, or Firm*—Faegre & Benson

[57] ABSTRACT

An outlet fitting for portable turbines used in paint spraying, the outlet fitting including an exhaust pipe threadedly carrying an annular reducer sized to closely interfit with a cylindrical exhaust tube of the turbine and sealed thereto with an O-ring, with the outlet fitting secured to a wall of an enclosure for the turbine by a decorative ring.

15 Claims, 4 Drawing Sheets

OUTLET FITTING FOR A PORTABLE TURBINE

BACKGROUND OF THE INVENTION

This invention relates to the field of portable turbines useful in air-atomization spray painting, particularly in the field of high volume, low pressure (HVLP) air atomized paint spraying.

In the past an air mover in the form of a turbine was developed and manufactured for vacuum cleaner applications. Such turbines often, but not always, had a plastic outlet housing including a plastic exhaust tube. In vacuum cleaner applications, the inlet or suction side was of most interest. In the present application, it has been found desirable from a cost standpoint to utilize such a large outlet turbine to provide atomization air for HVLP spray painting. The turbine was put into an enclosure and the outlet of the turbine was desirably connected via a hose to a hand-held spray gun. The exhaust tube of such turbines, while economic, was not suitable for direct connection to the air hose, being of a larger diameter and not having any means to retain the hose to the exhaust tube, the end portion of which was generally a simple cylinder. The present invention allows utilization of such economic turbines by providing an outlet fitting that is itself economical and easy to install, and which further provides a convenient and secure means to removably attach the spray gun air hose exteriorly of the enclosure containing the turbine. Additionally, the outlet fitting of the present invention allows quick and easy disassembly of the turbine from the fitting should service or replacement of the turbine be required. Additionally, when the exhaust tube of such turbines was made of plastic, attempts to thread an adapter or reducer into the exhaust tube were found to result in fracture and consequent destruction of the exhaust tube, a result which is avoided with the present invention.

DETAILED DESCRIPTION OF THE INVENTION

Figure 1:
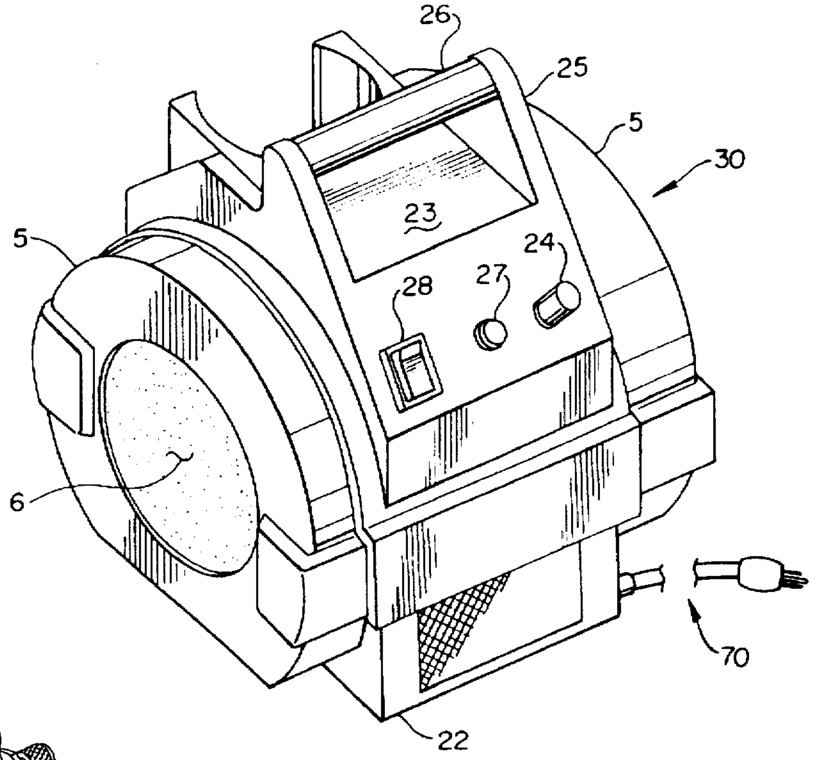
FIG. 1 is a perspective view of a turbine enclosure useful in the practice of the present invention.
Figure 2:
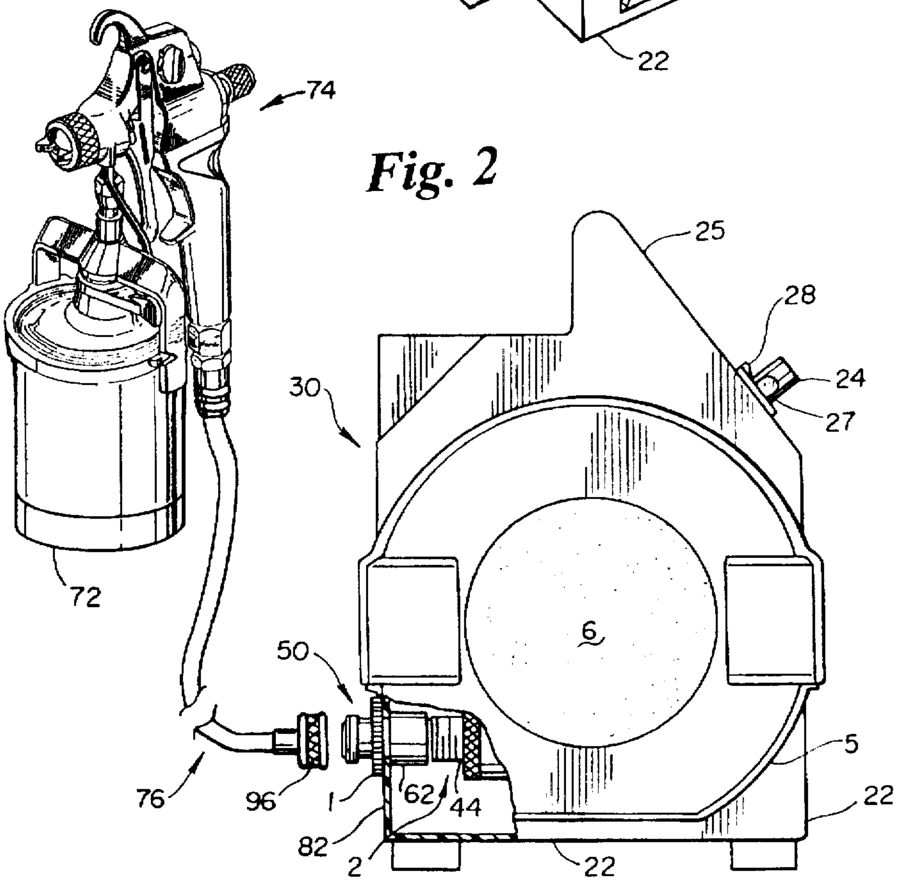
FIG. 2 is a partially cut away end view of the enclosure of FIG. 1, also showing a spray gun and hose useful in the practice of the present invention.

Referring to the Figures, and most particularly to FIGS. 1 and 2, a turbine enclosure 30 useful in the practice of the present invention may be seen. Enclosure 30 has a bottom housing 22, a top housing 25, and two filter cans or housings 5. A handle 26 is provided for carrying enclosure 30 and an electrical cord 70 is used to power the portable assembly. An ON-OFF switch 28, indicator light 27, and fuse holder 24 are located in top housing 25. A cup holder 23 forms a part of the enclosure 30 and is sized to receive a paint cup 72 of a hand-held spray gun 74. An air hose 76 is used to connect the gun to the turbine in enclosure 30. An air fan filter 6 is provided at one end of the enclosure 30 and is retained by one of the filter housings 5.

Figure 3:
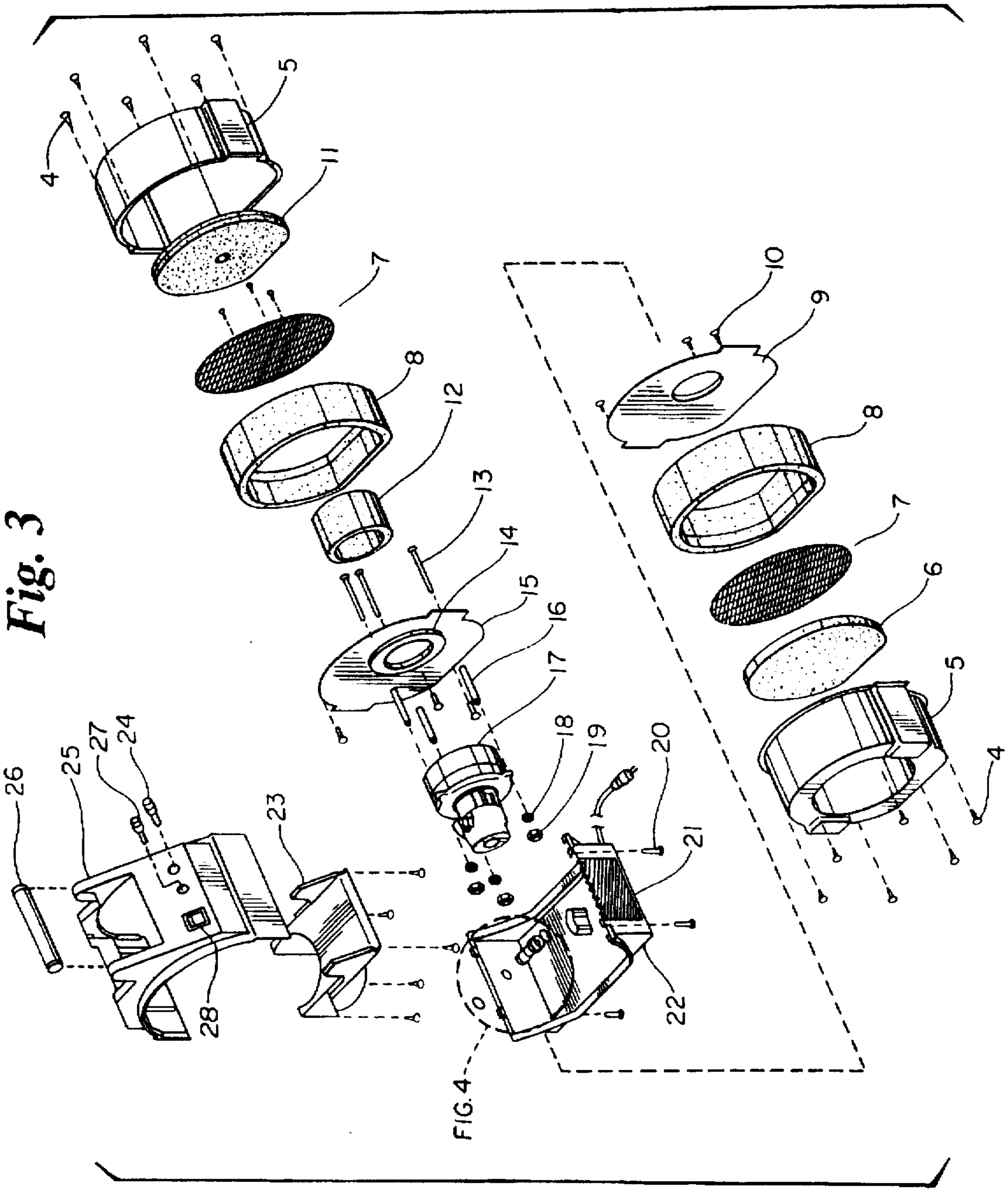
FIG. 3 is an exploded view of the enclosure of FIG. 1 showing parts contained therein.

Referring now also to FIG. 3, air for the turbine inlet is drawn through a two stage filter 11 in the other filter housing 5. A pair of identical filter screens 7 each support one of the filters 6 and 11, respectively, and a pair of foam fan noise rings 8 are included interior of the filter housings to suppress noise. In addition an additional foam silencer 12 can be used to suppress noise generated by turbine 17. Turbine 17 is preferably mounted to a sheet metal can cover 15 by bolts 13, spacers 16, washers 18 and nuts 19. An annular foam disk 14 seals the inlet side of turbine 17 against cover or plate 15. Similarly, a second can cover or plate 9 completes the filter can assembly at the other end of enclosure 30. Preferably sheet metal screws 4 are used to secure covers 9 and 15 to their respective filter housings 5.

A plastic or nylon cylindrical member 10 is preferably installed on the end of every other one of the sheet metal screws 4 to provide can mounting feet for each of the filter can subassemblies, and to provide a spacer function for securing each of the filter can subassemblies between the grooved flanges of the top and bottom housings 25, 22.

A perforated metal vent plate 21 permits motor cooling air to exhaust the enclosure 30. Four cap screws 20 are preferably used to secure the top and bottom housings 25, 22 together, retaining the filter can assemblies at each end of enclosure 30.

Figure 4:
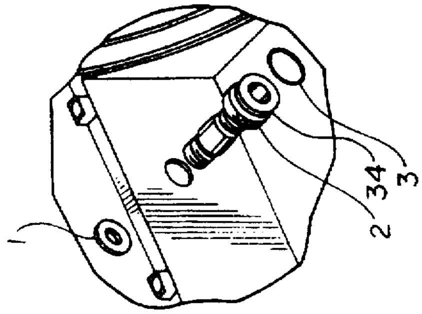
FIG. 4 is an enlarged view of a portion of FIG. 3, showing certain details of the outlet fitting of the present invention.
Figure 8:
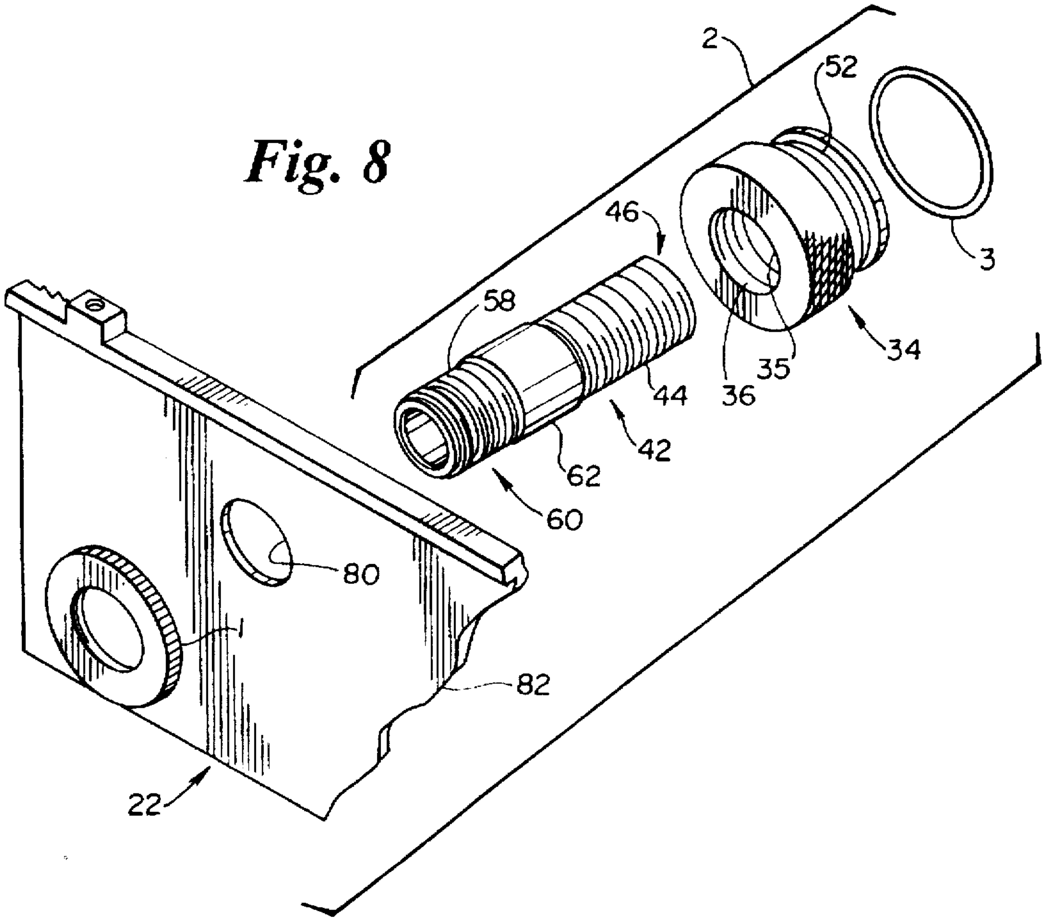
FIG. 8 is an exploded view of the outlet fitting of the present invention, together with a fragmentary perspective view of a wall of the enclosure of FIG. 1.
Figure 9:
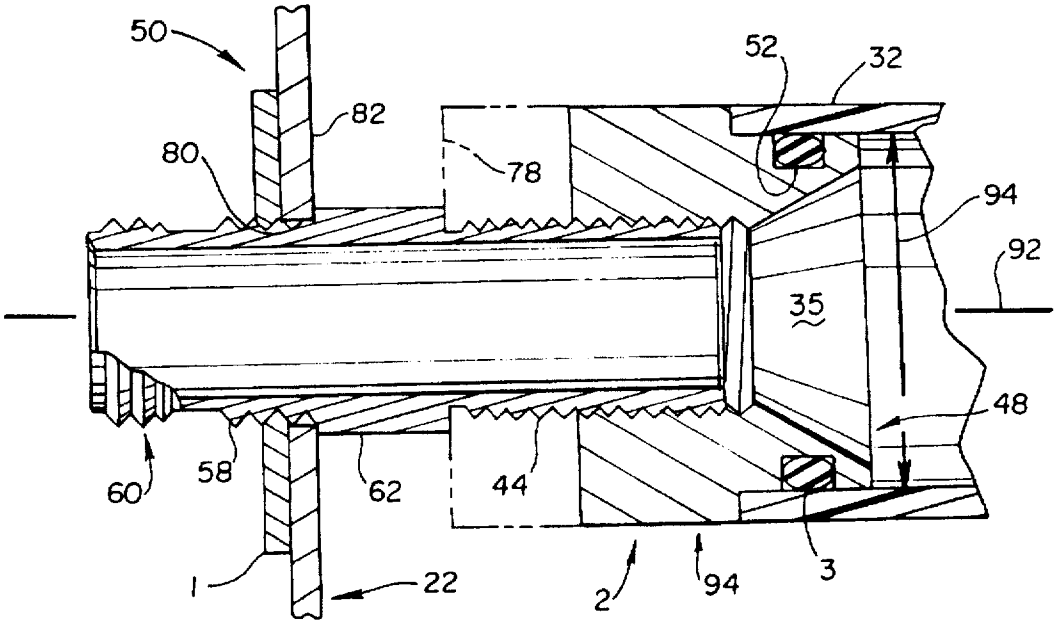
FIG. 9 is a fragmentary, partial section view of the outlet fitting of the present invention.

Turning now to FIGS. 4 and 8, the outlet fitting 2 of the present invention may be seen in more detail. Outlet fitting 2 includes an annular reducer member 34, an O-ring 3, an exhaust pipe 42, and a decorative ring 1. Fitting 2 is assembled by placing O-ring 3 in a groove 52 at a first end 48 of reducer 34. Reducer 34 is then preferably assembled on pipe 42 by interengaging internal threads 36 in a through bore 35 in reducer 34 with a first set of external threads 44 at a first end 46 of pipe 42 until reducer abuts an intermediate unthreaded portion 62, as shown by phantom line 78 in FIG. 9. A second end 60 of exhaust pipe 42 is then preferably inserted through an aperture 80 in a wall 82 of the bottom housing 22 of enclosure 30. An internally threaded decorative ring 1 is then preferably received on a second set 58 of external threads 58 at the second end 60 of pipe 42. Ring 1 can then be tightened on threads 58 to secure pipe 42 to wall 82 since a shoulder formed by the unthreaded portion 62 is larger in diameter than aperture 80.

Figure 7:
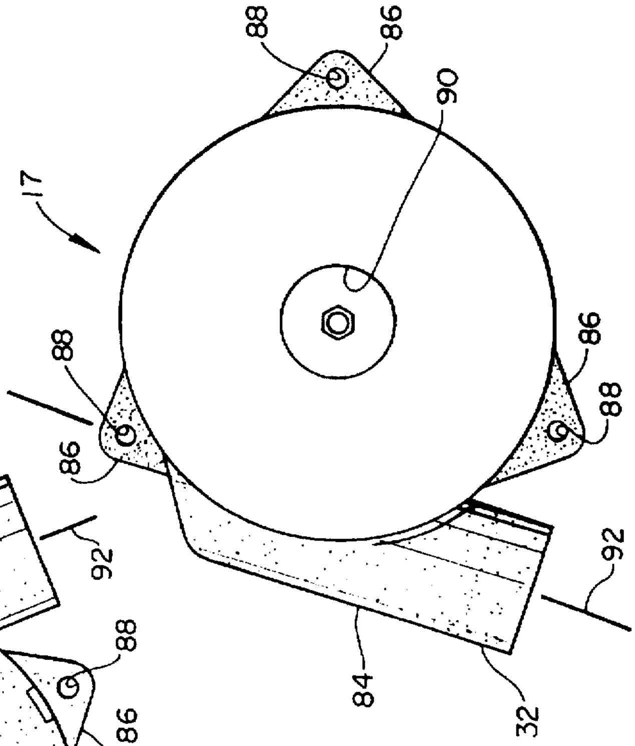
FIG. 7 is a view of a second end of the turbine of FIG. 5.
Figure 6:
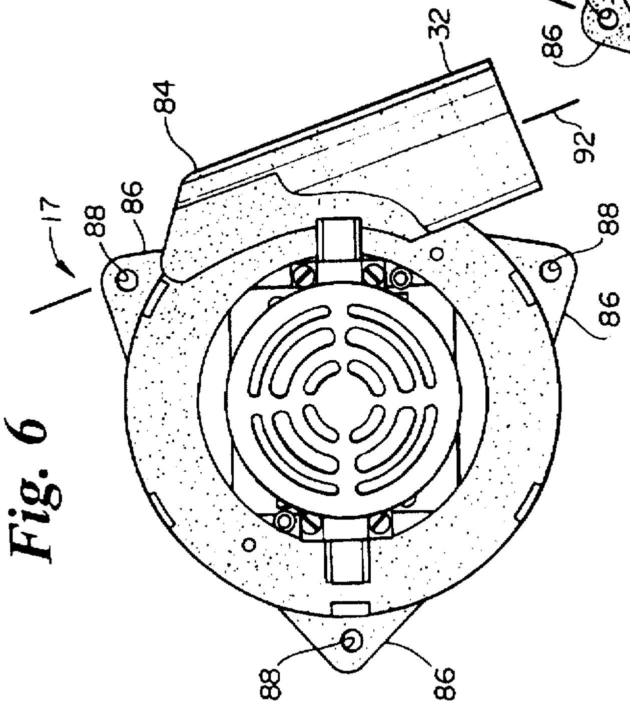
FIG. 6 is a view of a first end of the turbine of FIG. 5.
Figure 5:
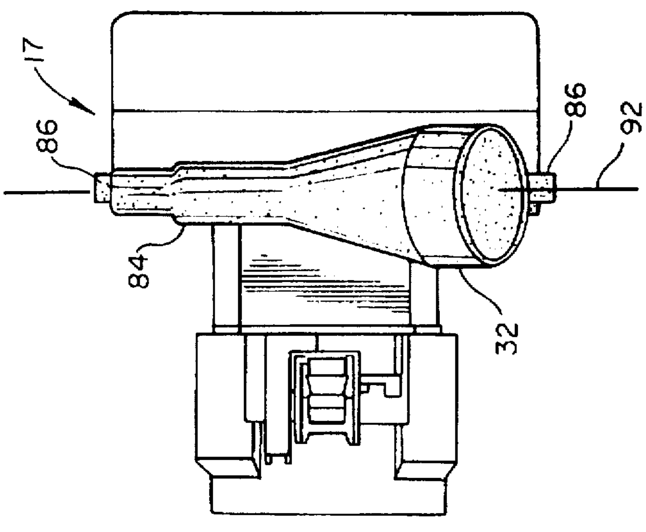
FIG. 5 is a side view of a large outlet turbine useful in the practice of the present invention.

Referring now also to FIGS. 5, 6, and 7, more details of the turbine 17 useful in the practice of the present invention may be seen. Turbine 17 preferably has a plastic housing and exhaust tube molded as a unit 84 and indicated by speckling in FIGS. 5–7. It is to be understood, however, that unit 84 may be formed of other materials, such as die-cast aluminum, as an alternative to plastic. Turbine 17 is mounted in enclosure 30 by three projections 86, each having an aperture 88 therethrough to receive one of the mounting bolts 13. Air is drawn in an inlet aperture 90 of turbine 17, compressed and delivered via an exhaust tube 32. Tube 32 exhausts air generally tangentially of turbine 17 and along a cylindrical axis 92. Tube 32 is to be understood to be cylindrically shaped at its outlet end, concentric to axis 92. It is to be further understood that when outlet fitting 2 is installed in aperture 80, it will be coaxially aligned with and axially spaced apart from tube 32 along axis 92, when the turbine 17 is installed in enclosure 30. Once fitting 2 and turbine 17 are thus aligned, reducer member 34 is preferably "backed-off" or partially unthreaded along pipe 42, causing O-ring 3 to become compressed between an interior diameter 94 of tube 32 and the annular reducer 32 to prevent air from leaking therebetween. Once the outlet fitting is installed, air exiting the turbine 17 is directed to pass through the annular reducer 32 and the exhaust pipe 42 where it is presented at the exterior of the enclosure 30 for transmission via hose 76 to spray gun 74. As may be seen in FIG. 2, a threaded connector 96 is preferably provided on one end of hose 76 for connection to threads 58 on pipe 42. As may be seen most clearly in FIG. 9, wall 82 is preferably generally perpendicular to axis 92 of tube 32.

The invention is not to be taken as limited to all of the details thereof as modifications and variations thereof may be made without departing from the spirit or scope of the invention. For example, reducer 34 may be made of somewhat resilient material if desired to eliminate O-ring 3. Furthermore, but not by way of limitation, mounting means 50, which in the embodiment shown includes ring 1, may be any other suitable means, such as a press or threaded or snap fit with wall 82, or a clip or retaining ring (for example) may be used in place of threaded ring 1.

What is claimed is:

1. An outlet fitting combination with a portable turbine carried in an enclosure, the turbine having an exhaust tube of fixed internal diameter, the outlet fitting in combination with the turbine and enclosure, the outlet fitting comprising:

a) an annular reducer member having a bore therethrough carrying internal threads and having an external diameter at a first end thereof closely interfitting the internal diameter of the exhaust tube of the portable turbine; and b) an exhaust pipe having a first set of external threads thereon at a first end thereof to matingly engage the internal threads of the annular reducer and wherein the exhaust pipe further has mounting means securing the exhaust pipe to the enclosure of the turbine.

2. The outlet fitting combination of claim 1 wherein the reducer further comprises an external groove at the first end thereof and wherein the outlet fitting further comprises:

c) an O-ring carried in the groove sealing the fitting to the exhaust tube.

3. The outlet fitting combination of claim 1 wherein the mounting means comprises an internally threaded decorative ring received on a second set of external threads located at a second end of the exhaust pipe distal of the first set of threads and exterior of the enclosure.

4. The outlet fitting combination of claim 3 wherein the exhaust pipe further comprises an unthreaded portion intermediate the first and second sets of threads, the unthreaded portion having a diameter larger than a diameter of the second set of threads.

5. The outlet fitting combination of claim 1 wherein the exhaust tube of the turbine is formed of plastic.

6. The outlet fitting combination of claim 1 wherein the exhaust tube of the turbine is formed of aluminum.

7. A method of connecting to the outlet of a turbine having an exhaust tube comprising the steps of:

a) threading an annular reducer having a bore therethrough onto an exhaust pipe;

b) installing the exhaust pipe in a wall of an enclosure for the turbine and in alignment with an exhaust tube of the turbine; and c) backing the annular reducer along the threads of the exhaust pipe until the reducer is received in the exhaust tube of the turbine.

8. The method of claim 7 wherein step a) further comprises installing an O-ring on the exterior of the annular reducer and step c) further comprises compressing the O-ring between an interior diameter of the exhaust tube and the annular reducer to prevent air from leaking between the exhaust tube and the annular reducer when the reducer is received in the tube.

9. The method of claim 7 wherein step b) further comprises inserting the exhaust pipe through an aperture in the wall of the enclosure and threading a decorative ring on the exhaust pipe exterior of the wall to retain the pipe to the wall.

10. A combined outlet fitting, turbine and enclosure assembly for portable paint spraying, the assembly comprising:

a) a turbine having a generally cylindrical exhaust tube projecting along a cylindrical axis;

b) an enclosure carrying the turbine and having a wall spaced apart from the cylindrical exhaust tube and positioned generally perpendicularly to the cylindrical axis of the exhaust tube;

c) an outlet fitting having i) an exhaust pipe threaded at one end thereof, and ii) an annular reducer having a bore therethrough threadably received on the exhaust pipe;

wherein the outlet fitting is secured to the wall of the enclosure and projects generally perpendicularly thereto and interiorly of the enclosure in alignment with the cylindrical axis, and further wherein the annular reducer is received in and seals against the cylindrical exhaust tube of the turbine to direct air exiting the turbine to pass through the annular reducer and the exhaust pipe for delivery exterior of the enclosure.

11. The assembly of claim 10 further comprising iii) a threaded end on the exhaust pipe projecting exteriorly of the wall of the enclosure, and d) a spray gun and air hose connected to the threaded end of the pipe to provide atomization air from the turbine to the gun for paint spraying.

12. The assembly of claim 11 further comprising a decorative ring threadably received on the threaded end of the exhaust pipe exterior of the enclosure to secure the pipe to the wall of the enclosure.

13. The assembly of claim 10 wherein the exhaust tube of the turbine is formed of plastic.

14. The assembly of claim 10 wherein the exhaust tube of the turbine is formed of aluminum.

15. The assembly of claim 10 further comprising an O-ring located between the annular reducer and the exhaust tube of the turbine.

* * * * *